Figure 1:
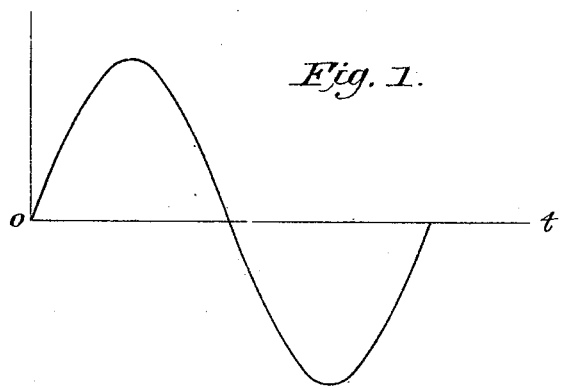

(No Model.) 8 Sheets—Sheet 1.
M. HUTIN & M. LEBLANC.
METHOD OF AND APPARATUS FOR TRANSFORMING ALTERNATING ELECTRIC CURRENTS.

No. 572,510. Patented Dec. 1, 1896.

WITNESSES:

INVENTORS: Maurice Hutin. Maurice Leblanc BY Joseph Lyons ATTORNEYS.

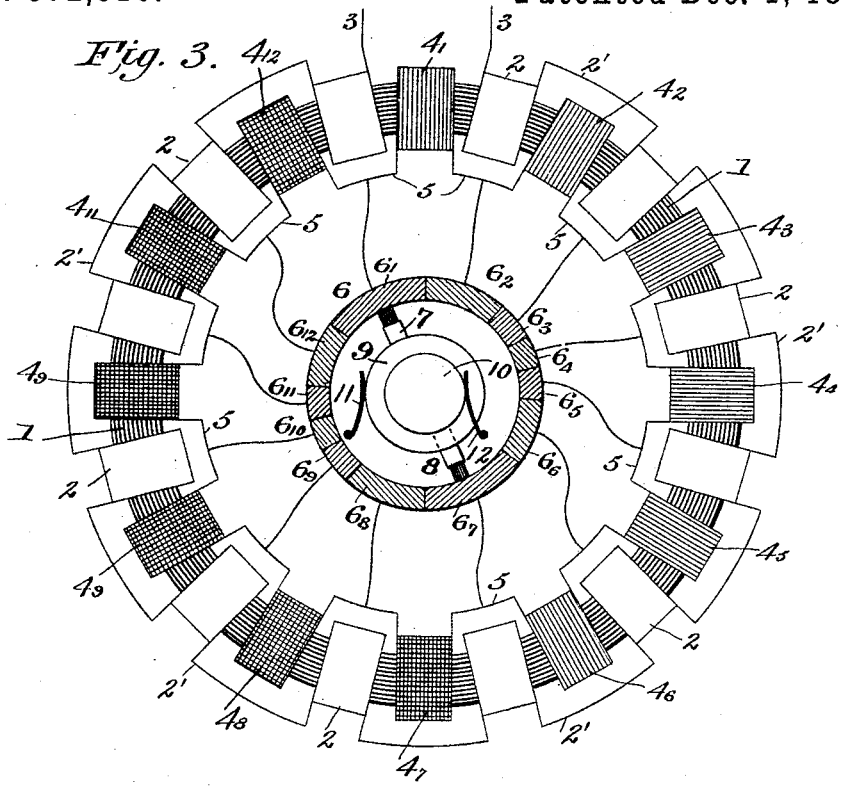

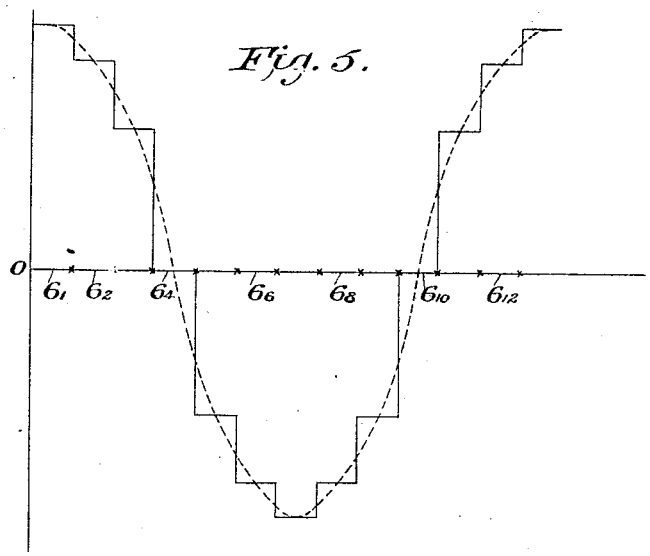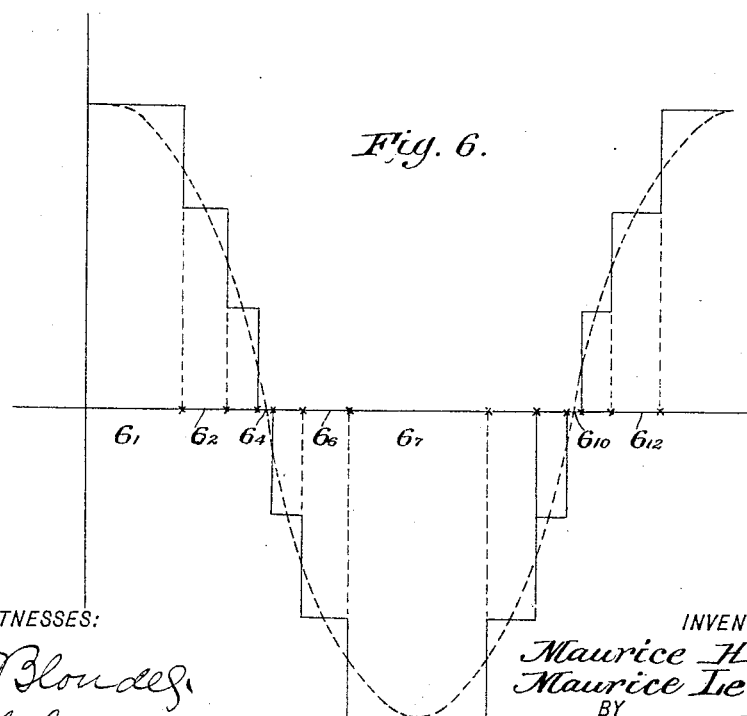

(No Model.) 8 Sheets—Sheet 4.
M. HUTIN & M. LEBLANC.
METHOD OF AND APPARATUS FOR TRANSFORMING ALTERNATING ELECTRIC CURRENTS.

No. 572,510. Patented Dec. 1, 1896.

WITNESSES:
INVENTORS
Maurice Hutin.
Maurice Leblanc.
BY
Joseph Lyons.
ATTORNEYS.

(No Model.) 8 Sheets—Sheet 5.
M. HUTIN & M. LEBLANC.
METHOD OF AND APPARATUS FOR TRANSFORMING ALTERNATING ELECTRIC CURRENTS.
No. 572,510. Patented Dec. 1, 1896.
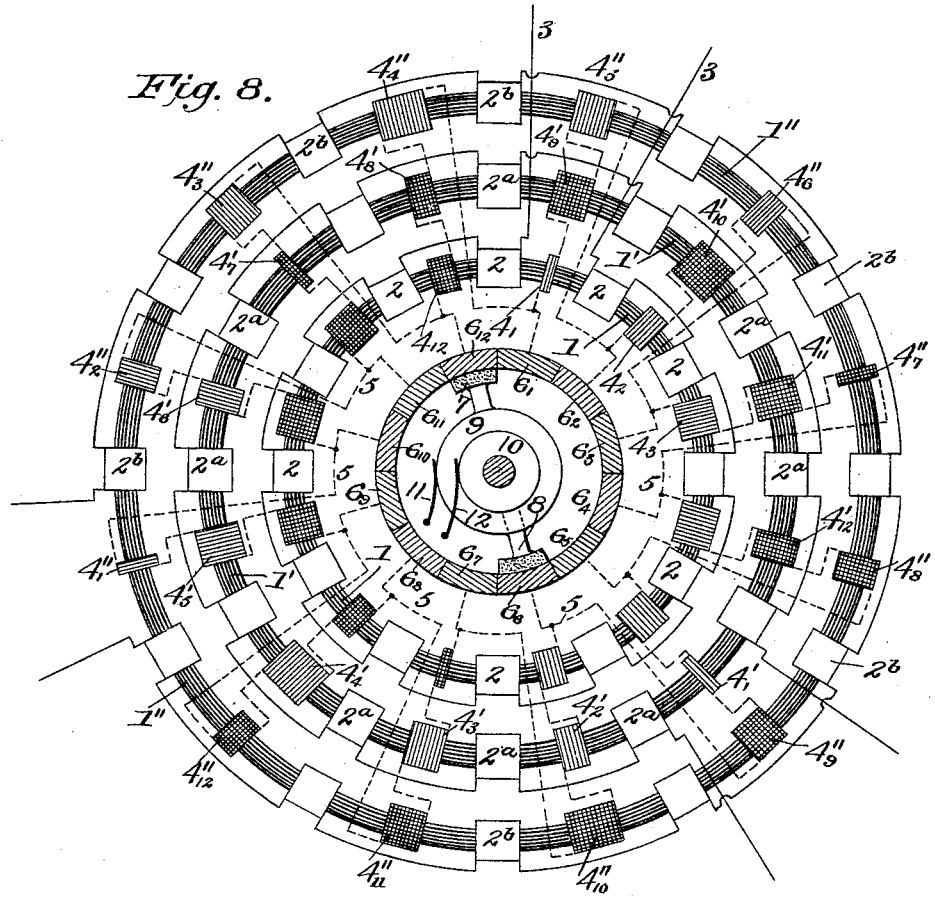
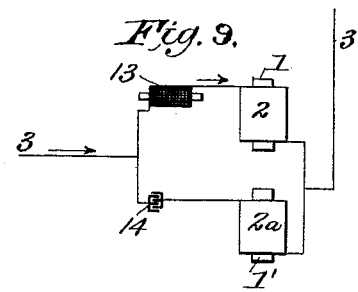

(No Model.) 8 Sheets—Sheet 6.
M. HUTIN & M. LEBLANC.
METHOD OF AND APPARATUS FOR TRANSFORMING ALTERNATING ELECTRIC CURRENTS.

No. 572,510. Patented Dec. 1, 1896.

WITNESSES:
Fred White
C. K. Fraser.

INVENTORS:
Maurice Hutin and
Maurice Leblanc,
By their Attorneys:
Arthur E. Fraser (No Model.) 8 Sheets—Sheet 7.
M. HUTIN & M. LEBLANC.
METHOD OF AND APPARATUS FOR TRANSFORMING ALTERNATING ELECTRIC CURRENTS.

No. 572,510. Patented Dec. 1, 1896.

WITNESSES:
Fred White
C. K. Fraser.

INVENTORS:
Maurice Hutin and
Maurice Leblanc,
By their Attorneys.
Arthur E. Fraser (No Model.) 8 Sheets—Sheet 8.
M. HUTIN & M. LEBLANC.
METHOD OF AND APPARATUS FOR TRANSFORMING ALTERNATING ELECTRIC CURRENTS.
No. 572,510. Patented Dec. 1, 1896.
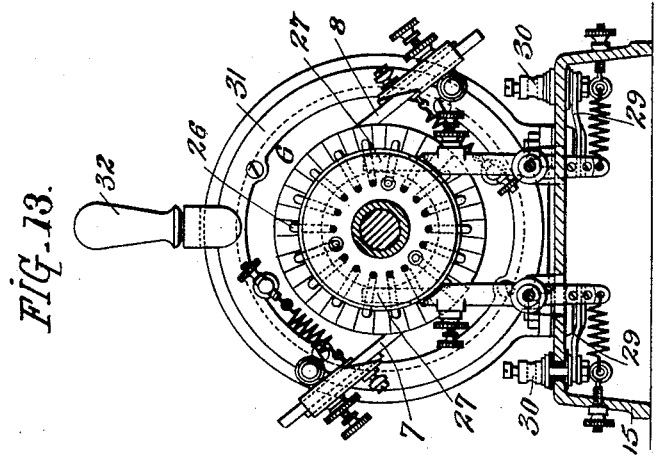
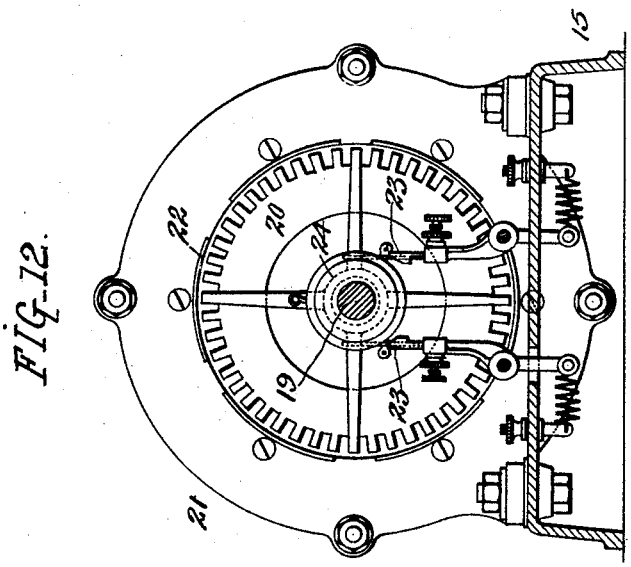
WITNESSES:
Fred White
C. K. Fraser.
INVENTORS:
Maurice Hutin and
Maurice Leblanc,
By their Attorneys:

UNITED STATES PATENT OFFICE.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ÉLECTRICITÉ, OF SAME PLACE.

METHOD OF AND APPARATUS FOR TRANSFORMING ALTERNATING ELECTRIC CURRENTS.

SPECIFICATION forming part of Letters Patent No. 572,510, dated December 1, 1896.

Application filed November 4, 1892. Serial No. 450,925. (No model.) Patented in France September 3, 1892, No. 224,118, and in England October 6, 1892, No. 17,826.

*To all whom it may concern:*

Be it known that we, MAURICE HUTIN and MAURICE LEBLANC, citizens of the French Republic, and residents of Paris, France, have invented certain new and useful improvements in a method of transforming alternating electric currents of any tension into continuous currents, also of any tension, and conversely, and apparatus for that purpose, (which invention is patented in Great Britain, No. 17,826, dated October 6, 1892, and also in France, No. 224,118, dated September 3, 1892,) of which the following is a specification.

Our invention has reference to improvements in the method of and apparatus for transmission of electrical energy, the principal feature of which is the conversion of alternating currents into currents of one direction, generally spoken of as "straight" currents, and the conversion of straight currents into alternating currents. In both processes the alternating currents may be either monophase or polyphase currents of any tension, and the straight currents also may be of any tension. By our system, therefore, it becomes practicable to transmit over a line or lines alternating currents of any tension, either monophase or polyphase, to a distant station, and there transform the same into straight currents of the same or any other tension and feed these currents to any suitable translating devices, and it also becomes practicable to send over a line straight currents of any tension to a distant station and there transform the same into monophase or polyphase true alternating currents and feed the same to any suitable translating devices.

In the practice of our invention a great variety of apparatus may be used, some of which we have illustrated in the accompanying drawings, and in the same drawings we have also shown diagrams explanatory of the principles upon which our invention is based and by which our invention is distinguished.

Figure 2:
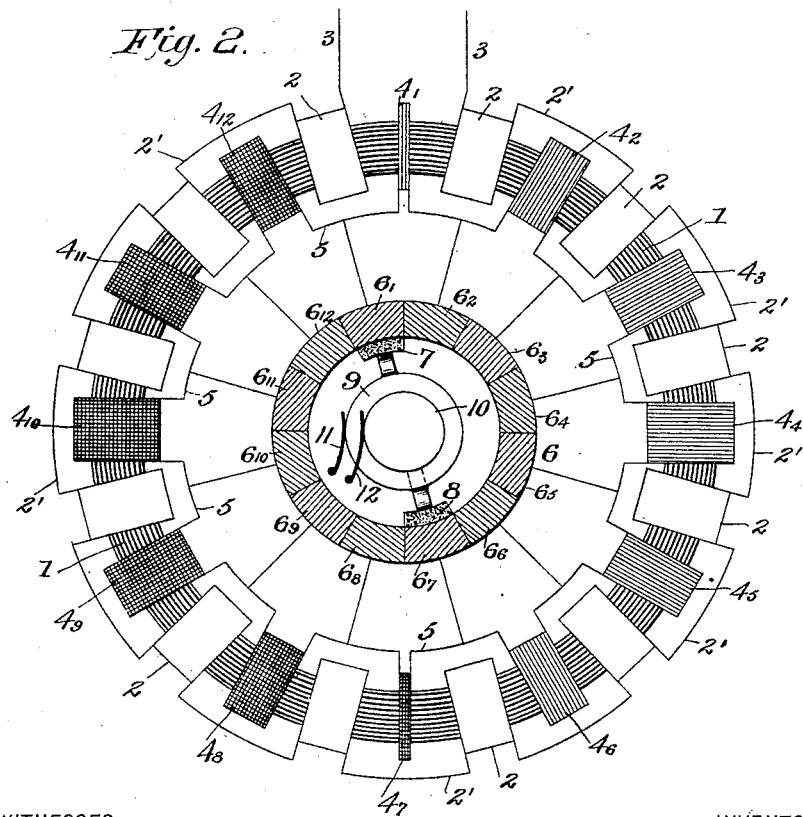
Figure 7:
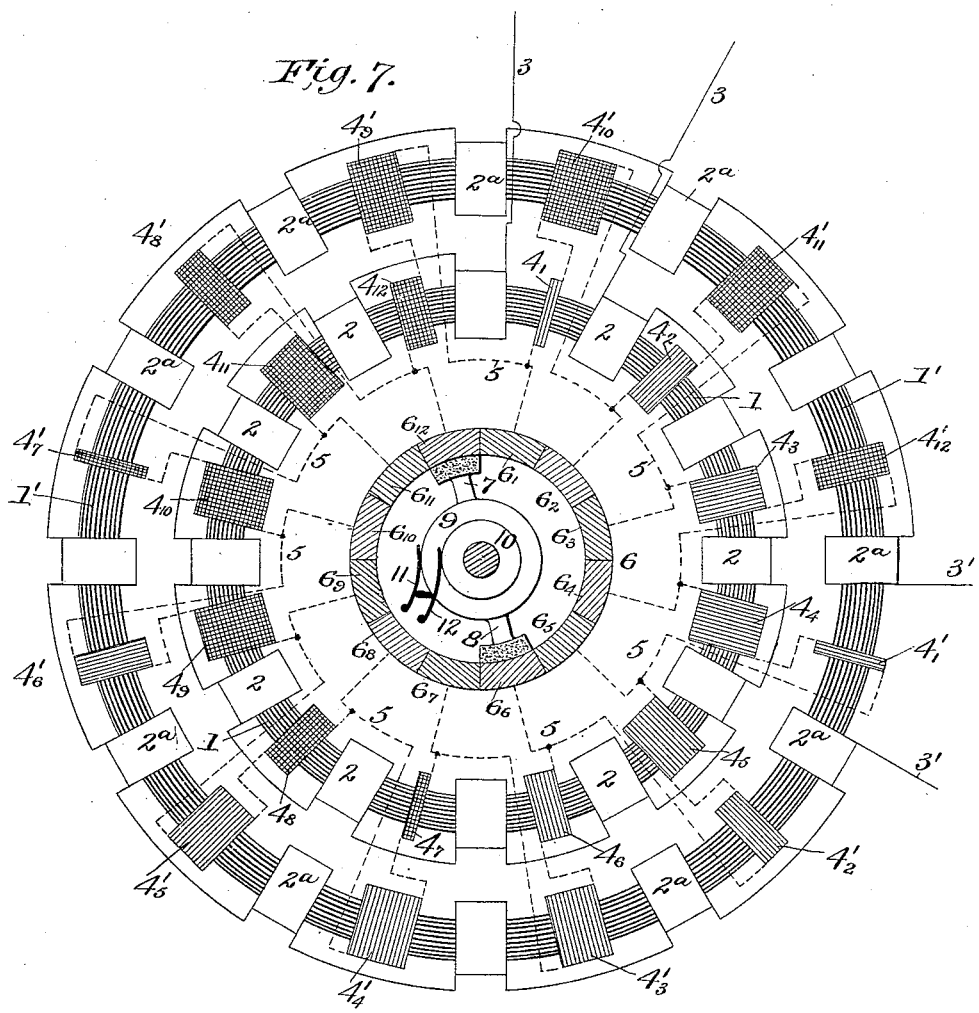
Figure 10:
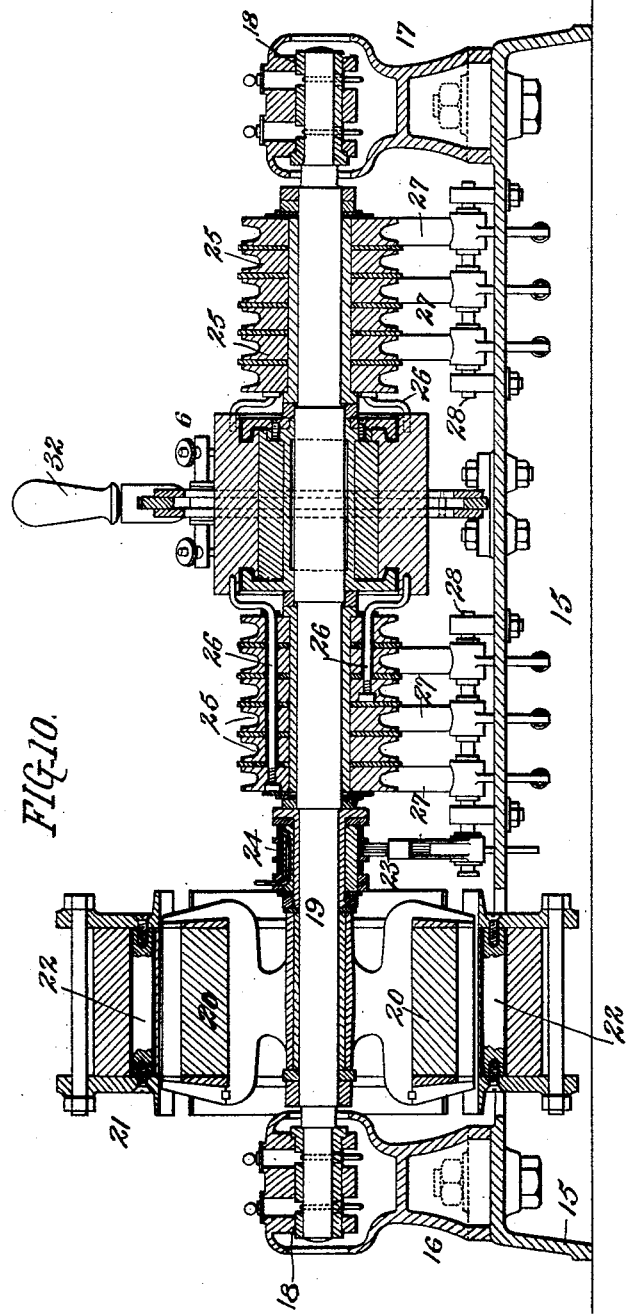
Figure 11:
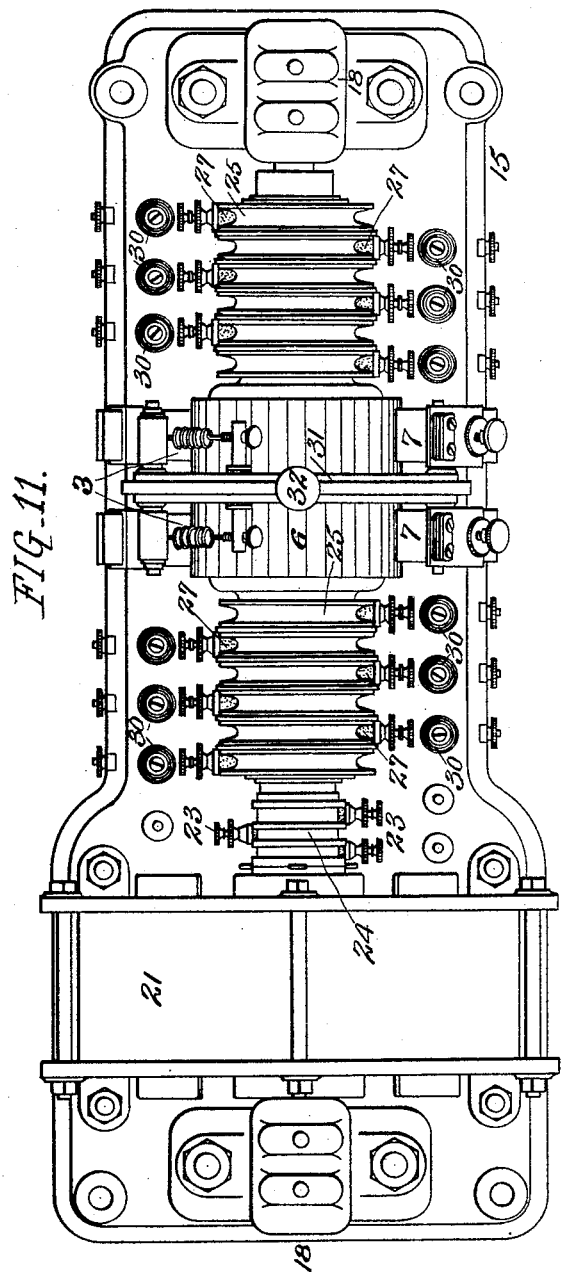

In the drawings, Figure 1 represents a curve which is a characteristic of alternating magnetic fluxes and of alternating electromotive forces and currents resulting therefrom, familiarity with which is necessary for the understanding of our invention. Fig. 2 illustrates in skeleton an embodiment of our invention for the conversion of monophase alternating currents into straight currents, and vice versa. Fig. 3 illustrates a modification of the apparatus shown in Fig. 2. Figs. 4, 5, and 6 are diagrams explanatory of our method and of the mode of operation of our apparatus. Figs. 7 and 8 are views similar to Figs. 2 and 3, but representing a skeleton of apparatus for transforming two-phase and three-phase alternating currents, respectively, into straight currents, and vice versa. Fig. 9 illustrates a mode of dividing a single-phase current into two-phase currents. Fig. 10 is a longitudinal section of a combined collector and commutator, indicating also a motor for driving the same, the whole constructed in accordance with our invention. Fig. 11 is a plan view of the same. Fig. 12 is a cross-section of the machine near the motor end of the same, and Fig. 13 is a cross-section near the commutator part of the machine.

Like numerals of reference indicate like parts.

It is well known that an alternating electric current generated by magnetic or by electro-dynamic induction continuously increases from zero up to a certain maximum, and then decreases again to zero. It then becomes negative, that is to say, the movement of electricity is now conceived as being in the opposite direction, increasing to a negative maximum which is numerically equal to the positive maximum, and then continuously decreases again to zero. The time during which the current passes through all these phases is called the "period" of the current and is usually designated by the letter T. It is, as a rule, a small fraction of a second. The time counted from the origin of the period to any intermediate phase we designate by the letter $t$, and by A we designate the maximum of the current during the whole period, which maximum is evidently at one time positive and at another time negative. If this nomenclature is adopted, then the curve representing all phases of an alternating current is analytically expressed by the formula $$I = A \sin 2\pi \frac{t}{T};$$

that is to say, the curve is a sinusoidal curve, such as is indicated in Fig. 1, the abscissæ of which represent fractions of the period, and the ordinates of which represent the intensities of the current at these moments. Supposing now that a magnetic core, closed upon itself, is provided with a coil having N turns and that an alternating current of the kind above defined is passed through the coil, then the number of ampere-turns of the circuit is $$N A \sin 2\pi \frac{t}{T},$$

and these ampere-turns may be represented by a curve similar to that of Fig. 1. The ampere-turns therefore, depending solely upon the current and upon the number of turns of the coil, may be varied by varying either or both of these factors, and the ampere-turns may be maintained constant if one of the factors is varied in an inverse ratio to the other factor, so as to maintain their product constant.

In the circuit which we have conceived the magnetic or electric effects will therefore remain the same if in place of an alternating current we pass a constant current of one direction through the coil, provided that at the same time the number of turns of the coil is varied in accordance with the sinusoidal law. It follows from this that if we consider an ordinary inductional transformer having two coils on the same magnetic core the magnetizing forces developed around the magnetic core will remain unchanged if, instead of passing through the primary coil, as is ordinarily done, an alternating current, we pass through the same a constant current, or, at least, a current having always the same direction, but at the same time vary the number of turns of the primary coil in such manner that the number of ampere-turns varies from moment to moment in accordance with a sinusoidal law. These considerations constitute the fundamental idea upon which our invention is based, and a simple embodiment of this idea is represented in Fig. 2.

Upon a magnetic ring-core 1 are placed a series of coils 2 2, preferably equally spaced and all of the same size and all connected in series by conductors 2'. The terminals 3 3 of the series are adapted to be connected with a source of alternating currents. Between the series of coils 2 2 are placed upon the core other coils $4_1, 4_2, 4_3$, &c., all connected in a closed series, like the coils of a Gramme ring, by conductors 5, and with the segments $6_1, 6_2, 6_3$, &c., of a commutator 6. Upon this commutator bear two brushes 7 8, connected, respectively, to collector-rings 9 10, upon which bear the brushes 11 12. By way of example we have shown twelve coils in the series $4_1 4_2 4_3$ to $4_{11} 4_{12}$, although any other number may be used, as will hereinafter more fully appear. Of this series of coils one half the number, $4_1 4_2$ to $4_5 4_6$, are wound in one direction, and the other half, $4_7 4_8$ to $4_{11} 4_{12}$, are wound in the opposite direction. Supposing now that each of these coils $4_1 4_2$ to $4_{11} 4_{12}$ have the same number of turns, and that a straight current is sent into these coils by the brushes 11 12 while the brushes 7 8 are in the position shown, it will be at once understood that the magnetizing effects of the two halves of the coils will be equal and will conspire.

As shown is the drawings, the coils $4_1, 4_2$, &c., are not of the same size, and we will presently refer more particularly to this feature of the actual construction; but for a clear understanding of the invention it will be useful to consider these coils for the moment as being all of the same size. If now the strength of the continuous current which is admitted by the brushes 11 12 is designated by J, and if the number of turns of each of the coils is designated by N, then it will be seen that if the brushes 7 and 8 bear upon the commutator-segments $6_1$ and $6_7$, respectively, as shown in the drawings, the number of ampere-turns developed around the ring and which tend to develop lines of force closed upon themselves in the interior of the ring will be 6, (N J.) If we now suppose the brushes 7 8 shifted so as to bear upon the commutator-segments $6_2 6_8$, each of the two branches of the ring-circuit will contain five coils wound in one direction and one coil in the opposite direction, and the effect will be the same as if there were in each branch only four coils, but wound in the same direction, and the number of ampere-turns around the magnetic core tending to develop lines of force closed upon themselves in the interior of the core will be reduced to 4, (N J.) In the same manner we find that if the brushes 7 8 bear upon the commutator-segment $6_3 6_9$ the number of ampere-turns will be reduced to 2, (N J,) and if the brushes bear upon the contacts $6_4 6_{10}$ the number of ampere-turns will be zero.

If the brushes bear upon the segments $6_5$ and $6_{11}$, respectively, the number of ampere-turns again becomes 2, (N J,) but the direction of the magnetizing force has changed, and if this change in the direction of the magnetizing force is noted by designating the corresponding number of ampere-turns by the negative sign, (−,) then the number of ampere-turns successively obtained by shifting the brushes 7 8 successively from the position shown unto the successive segments until they bear upon the segments 12 and 6, respectively, is found to be as indicated in the following table:

| Commutator-segments upon which bear the brushes— | | Number of ampere-turns developed. |
|---|---|---|
| 7. | 8. | |
| $6_1$ | $6_7$ | $+6$ (N J) |
| $6_2$ | $6_8$ | $+4$ (N J) |
| $6_3$ | $6_9$ | $+2$ (N J) |
| $6_4$ | $6_{10}$ | $0$ (N J) |
| $6_5$ | $6_{11}$ | $-2$ (N J) |
| $6_6$ | $6_{12}$ | $-4$ (N J) |
| $6_7$ | $6_1$ | $-6$ (N J) |
| $6_8$ | $6_2$ | $-4$ (N J) |
| $6_9$ | $6_3$ | $-2$ (N J) |
| $6_{10}$ | $6_4$ | $0$ (N J) |
| $6_{11}$ | $6_5$ | $+2$ (N J) |
| $6_{12}$ | $6_6$ | $+4$ (N J) |

In Fig. 4 is found a graphical representation of the effective ampere-turns developed while the commutator-brushes make one rotation, the successive sections of the abscissæ corresponding to the successive commutator-segments upon which the brush 7 bears, while the ordinates denote the ampere-turns developed in the corresponding positions of the brushes. We have in the above table and in the construction of the curve in Fig. 4 disregarded the fact that the brushes 7 8, during their rotation, bridge adjacent segments of the commutator, but will refer to this later on.

It will be noticed by reference to Fig. 4 that the upper ends of all the ordinates which have for their abscissæ the middle points of the lengths of the successive commutator-segments are situated upon the dotted lines $u$ $v$ $x$, and that the greater the number of commutator-segments the more nearly will the stepped curve coincide with these lines $u$ $v$ $x$. It follows from this that if in the apparatus represented in Fig. 2 a straight current is admitted by the brushes 11 12, and the brushes 7 8 are uniformly rotated, there will be generated by induction in the circuit of the series of coils 2 2, &c., a current the variations of which are a function of the variations of the ampere-turns, which latter are represented by the stepped line in Fig. 4, under the supposition that the coils $4_1$ $4_2$, &c., are all of the same size. If the number of these coils is great, the variations of the ampere-turns will be represented by the dotted lines $u$ $v$ $x$; that is to say, the ampere-turns will uniformly decrease to zero and then become negative, and again uniformly increase to a negative maximum, &c. The induced current resulting therefrom will be of constant strength, but alternating in direction. Conversely, if such alternating current be admitted by the terminals 3 3 while the brushes 7 8 are rotated with a uniform velocity equal to the period of the alternating current, there will be received by the induction in the circuit of coils $4_1$ $4_2$, &c., at the brushes 11 12, a constant current of uniform direction. Alternating currents, however, as ordinarily generated are not constant in strength, but vary in accordance with a sinusoidal law, as represented by the curve shown in Fig. 1, and upon an enlarged scale by the dotted curve shown in Fig. 5. In order, therefore, to obtain from a straight current admitted by the brushes 11 12 a sinusoidal alternating current from the terminals 3 3, it is necessary that the ampere-turns developed successively when the brushes 7 8 come in contact with the successive commutator-segments be represented by the ordinates of a sine curve. This result we obtain by making the number of turns of the successive coils $4_1$ $4_2$, &c., increase and decrease with reference to each other in accordance with a sinusoidal law.

Designating by $\gamma$ a constant number of turns of coil-winding and by $\alpha$ an arbitrary constant quantity, then the number of turns which we give to each of the twelve coils $4_1$, $4_2$, &c., is as follows:

| Coil. | Number of turns of the coil. |
|---|---|
| $4_1$ | $\gamma \sin \alpha$. |
| $4_2$ | $\gamma \sin \left(\alpha + 1 \cdot \frac{2\pi}{12}\right)$. |
| $4_3$ | $\gamma \sin \left(\alpha + 2 \cdot \frac{2\pi}{12}\right)$. |
| $4_4$ | $\gamma \sin \left(\alpha + 3 \cdot \frac{2\pi}{12}\right)$. |
| $4_5$ | $\gamma \sin \left(\alpha + 4 \cdot \frac{2\pi}{12}\right)$. |
| $4_6$ | $\gamma \sin \left(\alpha + 5 \cdot \frac{2\pi}{12}\right)$. |
| $4_7$ | $\gamma \sin \left(\alpha + 6 \cdot \frac{2\pi}{12}\right)$. |
| $4_8$ | $\gamma \sin \left(\alpha + 7 \cdot \frac{2\pi}{12}\right)$. |
| $4_9$ | $\gamma \sin \left(\alpha + 8 \cdot \frac{2\pi}{12}\right)$. |
| $4_{10}$ | $\gamma \sin \left(\alpha + 9 \cdot \frac{2\pi}{12}\right)$. |
| $4_{11}$ | $\gamma \sin \left(\alpha + 10 \cdot \frac{2\pi}{12}\right)$. |
| $4_{12}$ | $\gamma \sin \left(\alpha + 11 \cdot \frac{2\pi}{12}\right)$. |

More generally, if there are $2n$ coils the coil having the index $p$ will have a number of turns represented by the expression $$\gamma \sin \left[\alpha + (p-1) \frac{2\pi}{2n}\right].$$

If the numbers of the windings of the coils are thus graduated, the turns of any two diametrically opposite coils on the ring-core are determined by the sines of arcs differing from each other by one-half of a circle, which means that the diametrically opposite coils have the same number of turns, but are wound in opposite directions. This being understood, it is clear that the algebraic sum of the number of windings included in the circuits between the two brushes 7 8 is always equal to the product of two factors, one of which is a constant and the other the algebraic sum of sines of arcs forming an arithmetical series, the common difference of which is $\frac{2\pi}{2n}$.

According to a well-known theorem, if by $x$ is designated the first arc of the series, and by K a constant quantity, the algebraic sum above referred to may be expressed by $$K \sin. x_1.$$

The quantity $x$ increases directly with the time when the brushes are displaced by a uniform movement along the commutator, so that the algebraic sum of the number of windings included in the circuits between the brushes 7 8 is a function of the time of the rotation of the brushes, and becomes the more nearly a sinusoidal function the greater the number of coils. The same thing is true of the ampere-turns developed step by step as the brushes 7 8 come successively in contact with the successive commutator-segments, that is to say, they are a sinusoidal function of the time of the rotation of the brushes if this rotation is uniform, and the curve representing the succession of ampere-turns during a complete rotation of the brushes will approach the more closely a sinusoidal curve the greater the number of coils.

In Fig. 5 the abscissæ represent, the same as in Fig. 4, the successive commutator-segments, and the ordinates the corresponding ampere-turns, while the dotted curve shows the sinusoidal curve with which the upper ends of the ordinates would coincide if the number of coils were increased. For practical purposes, however, we have found that twelve coils, and even a lesser number, give a sufficiently close approach to a sinusoidal curve.

From all this it will now be clear that if in the apparatus represented in Fig. 2 a straight current is admitted by the brushes 11 12 and the brushes 7 8 are rotated with uniform speed there will be developed ampere-turns about the ring, the rise and fall of which follow the law of a sine curve, and that therefore there are developed by induction in the coils of the series 2 2, &c., alternating currents of the sinusoidal form. Conversely if alternating currents of the sinusoidal form are admitted by the terminals 3 3 and the brushes are rotated synchronously with the periods of these currents a straight current will be received from the brushes 11 12. This straight current, however, while it will be constant in direction, will not be of uniform strength. If such current is used for the operation of electric motors or other translating devices having considerable self-induction, no inconvenience is experienced, but for the charging of secondary batteries such undulating current is ill adapted. These undulations, however, may in a great measure be overcome by the proper use of suitable condensers in shunt between the binding-post of the alternating-current circuit or by the use of a strong reaction-coil in the circuit of the redressed current.

By the use of the apparatus shown in Fig. 2 the sinusoidal variation of ampere-turns is obtained by graduating the coils of the circuit $4_1$ $2_2$, &c., in accordance with the variations of the ordinates of a sine curve corresponding to uniformly-increasing abscissæ and making the commutator-segments all of the same width. The method, however, can be varied by making the coils $4_1$ $2_2$, &c., all alike, and graduating the width of the commutator-segments. This is shown in Fig. 3, which requires no further explanation. In Fig. 6 the effect of this modified arrangement is graphically represented. Since the commutator-segments $6_1$ $6_2$ $6_3$, &c., are graduated, and the brushes 7 8 are rotated with uniform velocity, the times during which the ampere-turns have their successive values are proportional to the width of these segments, (the width of the brushes being neglected,) and since the coils are all of the same size the ampere-turns increase and decrease successively by the same increments and decrements. Consequently the abscissæ in Fig. 6 are shown graduated in the same manner as the commutator-segments in Fig. 3, while the differences between the corresponding successive ordinates are all equal. If the number of coils and segments is made large enough, the curve which connects the upper ends of the ordinates would represent variation of ampere-turns from moment to moment, and consequently also the alternating current derived from the terminals 3 3. This is indicated by the dotted line in Fig. 6, and it will be clear that the segments may be graduated to obtain an alternating current the variations of which conform to any desired law, and consequently also to a sinusoidal law.

As stated above, the undulations of the redressed current are objectionable, and they may be entirely avoided; that is to say, the redressed current may be made quite constant if instead of a monophase alternating current a two-phase, three-phase, and, generally speaking, a polyphase current is redressed in accordance with our invention. The arrangement required for this purpose we have developed from the following theoretical considerations:

Calling the circuit of our apparatus in Fig. 2 or Fig. 3 which carries the alternating current the "primary" circuit, and the circuit from which the redressed current is obtained the "secondary" circuit, and using otherwise the denominations hereinbefore employed, it will be seen that if the brushes move with the uniform angular velocity $\frac{1}{T}$ the number of windings included in the secondary circuit from moment to moment may be expressed by $$\gamma \sin. 2\pi \frac{t}{T}.$$

Now supposing that by the primary circuit there is developed in the core of the transformer a variable flux, producing in each turn of the coils an electromotive force, expressed by $$H \sin. 2\pi \frac{t}{T},$$

wherein H is the maximum which that electromotive force may attain, then the total electromotive force in the secondary circuit will be $$\gamma H \sin.^2 2\pi \frac{t}{T},$$

which, as stated above, will give rise to a current which is always in the same direction, but which varies with the time. If now we have another apparatus exactly like that shown in Fig. 2, with this difference, however, that the primary circuit carries a current which is dephased with reference to that in the primary of the first apparatus by ninety degrees, the total electromotive force developed in its secondary circuit will be represented by the expression $$\gamma H \cos.^2 2\pi \frac{t}{T}.$$

If now the two secondary circuits are connected in series, the total electromotive force developed in the united circuit will be $$\gamma H \left( \sin.^2 2\pi \frac{t}{T} + \cos.^2 2\pi \frac{t}{T} \right) = \gamma H;$$

that is to say, the current thus obtained will be constant.

If three such apparatus as shown in Fig. 2 are employed, but with alternating currents in their primaries which are dephased with reference to each other by one-third of a wave, then the electromotive forces developed in the three secondary circuits will be $$\gamma H \sin.^2 2\pi \frac{t}{T},$$

$$\gamma H \sin.^2 2\pi \left( \frac{t}{T} + \frac{1}{3} \right),$$

$$\gamma H \sin.^2 2\pi \left( \frac{t}{T} + \frac{2}{3} \right),$$

respectively; and if these three secondary circuits are connected in series the total electromotive force developed in the united circuit will be equal to the sum of the three electromotive forces above enumerated, and this sum, as will readily be seen, is $$\frac{3}{2} \gamma H,$$

which is again a constant quantity; that is to say, the redressed current will be constant. In like manner it can be shown that any number of properly dephased alternating currents can be redressed into one constant continuous current by the employment of a like number of converters of the type shown in Fig. 2. We have found, however, that it is not necessary to use a separate commutator for each converter, but that it is practicable and preferable to use a single commutator in connection with any number of alternating currents.

The arrangement of the apparatus for two alternating currents dephased by one quarter of a wave is indicated diagrammatically in Fig. 7. The two transformer-rings 1 1' are shown in the drawings of different sizes, one surrounding the other, but it must be understood that this is only so shown for the sake of simplicity of illustration. In actual construction the two rings will be exactly equal. On each ring there are shown, in analogy to Fig. 2, twelve primary coils and twelve secondary coils, the latter graduated in accordance with the successive ordinates of a sine curve. The primary coils are marked 2 2 and $2^a$ $2^a$, &c. The secondary coils are marked $4_1$ $4_2$, &c., and $4_1'$ $4_2'$, &c., while the terminals of the primary circuits are marked 3 3 and 3' 3', respectively. The two rings are shown as shifted with reference to each other by ninety degrees, so that any secondary coil on one ring corresponds to a secondary coil on the other ring, and the number of convolutions of these coils are related to each other as the sines of arcs differing by ninety degrees. Each of these pairs of secondary coils are coupled in series with each other, and the successive pairs are also coupled in a series closed upon itself like the coils of a Gramme ring, while the connections with the segments of the commutator are precisely the same as in Fig. 2.

In order to facilitate the reading of the drawings, the primary coils are represented as blank segments, the secondary coils which are wound in one direction are represented as segments shaded radially, while the secondary coils wound in the opposite direction are represented as segments shaded both radially and circularly, and the size of the successive secondary coils is approximately indicated by different widths. From what has been said hereinbefore it will now be quite clear that if an alternating current is admitted by the terminals 3 3 and another alternating current, with its phase shifted by ninety degrees, is admitted by the terminals 3' 3', and if the brushes 7 8 are rotated synchronously with the period of these currents, a straight current that is always constant will be obtained by the brushes 11 12.

In Fig. 8 is represented the combination of three converter-rings with one commutator for redressing three-phase currents into a single continuous constant current, and conversely for converting a continuous current into a three-phase current. In this case there are three converter-rings, all constructed alike, but shifted with reference to each other by one hundred and twenty degrees, with the secondary coils occupying the same radius connected in series with each other and with the other radial groups of secondary coils, the whole complex series being closed upon itself and connected with the commutator-segments, as hereinbefore shown. It is clear from what has hereinbefore been said that three alternating currents shifted in phase by one hundred and twenty degrees, admitted by the terminals 3 3, 3' 3', and 3" 3", respectively, will be converted into a single continuous and constant current which may be received from the brushes 11 12, and conversely that a straight current admitted by the brushes 11 12 will be converted into three-phase currents, which may be received from the terminals 3 3, 3' 3', and 3" 3".

It will now be understood without further explanation that if we wish to convert any desired number of alternating currents into a constant continuous current there will be as many converter-rings as there are currents differing in phase. Generally speaking, if there are R currents differing in phase by $\frac{2\pi}{R}$, there must be provided R magnetic cores, around each of which circulates one of the R currents. The rings will be shifted with reference to each other by the same arc which marks the difference of phases of the currents, and the secondary coils in the same radial line, constituting a group, will be connected in series and the groups themselves in a closed series with each other.

In the apparatus constructed in accordance with the indications of Figs. 2, 7, and 8 the brushes 7 8 are made as wide as a commutator-segment and one of the insulations between the segments, so that practically at all times two diametrically opposite coils will be short-circuited. These coils, as is now understood, are in each case oppositely wound and of the same size, so that their subtraction has only the effect of reducing the number of ampere-turns developed at each step, but without otherwise affecting the operation.

With the arrangement shown in Fig. 3 the brushes 7 8 are made as narrow as practicable.

In the practice of our invention, as has been hereinbefore explained, a two-phase or multiphase current furnishes directly a constant straight current, while a monophase alternating current furnishes a continuous current in one direction which is more or less undulating. For this reason when the line furnishes a monophase alternating current it is preferable to convert the same into a two or three phase current where it passes to the primary coils. This is indicated in Fig. 9, where 3 3 represent the line, which at the transformer is divided into two branches, one containing the primary coil or coils 2 on the transformer-core 1 and the other the primary coil or coils $2^a$ on the transformer-core 1'. In one of these branches is included a self-induction coil 13 and in the other branch a condenser 14, and these two devices are of such size and capacity as is required to shift the phases of the currents in the two branches by one-quarter of a wave. In this manner we are enabled to obtain a practically-constant continuous current from a single-phase alternating current.

The converted currents may have either higher or lower tension than the original currents, since all that is necessary is to proportion the size of the wires and the number of turns of the primary with respect to the secondary in a manner well known and which requires no further explanation.

It will also be seen that the number of windings traversed by the current in one branch of what we have here called the "secondary" circuits will at all times be equal to the number of windings traversed by the same current strength in the other branch. Consequently the resistance of the two branches and the self-induction in the same will always be alike.

The construction of the actual working machine for practicing our invention may be varied in many ways, and in Figs. 10, 11, 12, and 13 we have illustrated one form of the machine which is suitable for our purpose, but it is not to be supposed that we limit ourselves to the details of construction here shown either as to shape or general arrangement of parts.

The machine, as represented in the drawings, has upon a base 15 two standards 16 17, one at each end of the base, and in which are the journal-bearings 18 18, supporting the shaft 19. To this shaft is keyed, near one end, the armature 20 of an alternating-current motor 21, adapted to make one rotation or a definite fraction of a rotation for each period of alternating currents by which it is actuated. This synchronous alternating-current machine may be of any improved type adapted to run in synchronism, but is preferably of the kind described in our Letters Patent No. 529,272, granted to us on November 13, 1894.

For the sake of simplicity of illustration we have omitted in the drawings the windings of the armature and of the field-magnets 22. The brushes 23 23, bearing upon the collector-rings 24, convey the alternating currents to the armature, and these currents may be derived from the line directly by suitable branches or may be reduced in tension by ordinary transformers between the line and motor. It is understood that this motor is only a small structure and that it requires little power, since the work which it has to perform is very light. Midway between the motor 21 and the standard 17 there is keyed upon the shaft 19 the commutator 6, the segments of which must be connected with the secondary coils of the converters. This connection is established in the following manner:

On each side of the commutator there are fixed upon the shaft 19 a series of collector-rings 25, insulated from the shaft and from each other. There are six such rings on each side of the commutator, since the machine is adapted for converters having twelve secondary coils each. The commutator, as shown in Fig. 14, has thirty-six segments, in which case groups of three will be connected together to one and the same collector-ring 25. These connections are shown as wires 26, passing through the collector-rings, insulated therefrom, but joined electrically each with one of these rings. Upon these collector-rings bear the brushes 27, which in groups of three are mounted upon rods 28, but of course insulated from each other. These brushes are in turn connected by slightly-flexible conductors 29 with binding-posts 30, and these in turn are connected each with one of the conductors 5, which, as shown in Figs. 2, 7, and 8, place the secondary coils of the converters in a closed series. The effect of this construction is the same as if the connections between the secondary coils of the converter or converters and the commutator-segments were made each by a single wire; but by the construction shown the commutator 6 becomes rotary, while the brushes 7 8 become stationary, which in practice is preferable. There being thirty-six commutator-plates, that is to say, three commutator-plates spaced one hundred and twenty degrees apart for each connection with the secondary coils of the transformer, the brushes 7 8 may be placed either at diametrically opposite points against the commutator or only sixty degrees apart; but in either case for each rotation of the commutator there will be three complete cycles in the transformer. The motor therefore will have six poles and will make one rotation during three successive periods of the currents which actuate the same. The brushes 7 8 are mounted upon a ring 31, rotatable about the commutator by means of a handle 32, as usual. Preferably there are two brushes 7 7 and 8 8 on each side, as indicated in Fig. 11, the commutator being made wide enough to afford room for them, and each pair may be connected so as to constitute in effect one brush, or they may be used independently for different lines.

If this apparatus is used for charging secondary batteries, the tension of the straight current obtained should be graduated to increase with the charge of the battery, and this can be done by inserting into each of the lines leading to the primary coils an adjustable reaction-coil, and all these coils may be adjusted simultaneously.

From the foregoing description it is evident that our process of transforming alternating currents into continuous currents and vice versa by induction is characterized by the fact that we produce no free poles in our converters, but that the magnetic flux generated in the cores of the same is entirely completed within these cores. The intensity only of the magnetic flux, but not its position in space, varies, and it varies in accordance with the law of variation of the alternating currents received or delivered, which is ordinarily a sinusoidal law. It is therefore necessary that the coefficient of mutual induction between the primary and secondary circuits of the individual converters also vary in accordance with a sinusoidal law, and this is produced by variations of the coefficient of self-induction of the circuits which receive or deliver the straight currents, as will be clear from the following considerations:

Designating by $L$ and $L_1$ the coefficients of self-induction of the primary and secondary circuits, respectively, the maximum value of the coefficient of mutual induction of the two circuits is $$M = \sqrt{L \times L_1}.$$

If, now, $n$ and $n_1$ represent, respectively, the number of effective turns of the primary and secondary coils, and $p$ the permeability of the core, there is $$L = 4 \pi p n^2, \text{ and } L_1 = 4 \pi p n_1^2.$$

In our converters $n$ remains constant, while $n_1$ varies in accordance with a sinusoidal law, thus:

$$n_1 = \gamma \sin. 2 \pi \frac{t}{T}.$$

Consequently $$L_1 = 4 \pi p \gamma^2 \sin.^2 2 \pi \frac{t}{T}.$$

From which $$M = 4 \pi p \gamma n \sin. 2 \pi \frac{t}{T}.$$

Similarly, if there are two conjugated individual transformers, the coefficient of mutual induction between the circuits of the second transformers will be $$M_1 = 4 \pi p \gamma n \cos. 2 \pi \frac{t}{T}.$$

The coefficient of mutual induction, therefore, for each individual transformer varies in accordance with a sinusoidal law, while the coefficient of self-induction of each secondary coil varies as the square of the sine (or cosine) of the alternating-current phase. The current elements derived from moment to moment from the brushes 7 8 or 11 12 in the apparatus shown in Figs. 2 and 3 are, as hereinbefore explained, a function of the square of the sine of the alternating-current phase. The total current, therefore, is of uniform direction, but varying in intensity, while in the case of two or more conjugated individual transformers, such as shown in Figs. 7 and 8, the total current derived from the brushes is the sum of two or more such varying currents, the variations of which, however, are dephased with reference to each other, so as to constitute together a constant current.

So long as any one of these principles is observed the apparatus for practicing the process may be varied without departing from our invention, and we are therefore not limited to the identical apparatus herein shown and described.

Having now fully described our invention, we claim and desire to secure by Letters Patent—

1. The method of converting alternating electric currents into currents of one direction or vice versa by dynamic induction, which consists in varying the coefficient of mutual induction of the circuits of a transformer or transformers in accordance with the law of variation of the alternating currents received or delivered by the said transformer or transformers, substantially as described.

2. The method of converting alternating electric currents into currents of one direction or vice versa, by inductional transformers, which consists in varying, for successive phases of the alternating current received or delivered by one circuit, the number of effective turns of the other circuit, in accordance with the law of variation of the alternating current, substantially as described.

3. The method of converting sinusoidal alternating currents into currents of one direction or vice versa, by inductional transformers, which consists in varying, for successive phases of the alternating current received or delivered by one circuit, the number of effective turns of the other circuit, in accordance with a sinusoidal law, substantially as described.

4. The method of converting a number of dephased alternating currents into a single constant current of one direction or vice versa, which consists in producing in two or more inductional transformers, in accordance with a sinusoidal law, dephased variations of the number of effective turns of the coiled circuits delivering or receiving currents of one direction, substantially as described.

5. The method of transforming a plurality of alternating currents of the same frequency and uniform phase difference into an undirectional current of substantially constant electromotive force, which consists in collecting such fractional portions of the currents as shall vary as the squares of the sines of the alternating-current phases, and superimposing the same, substantially as described.

6. An inductional transformer consisting of a magnetic ring-core and two circuits disposed upon the same, one of which is closed upon itself and comprises two equal, oppositely-wound groups of coils, and means for tapping the same at continuously-shifting diametrically opposite points, substantially as described.

7. An inductional transformer containing two circuits upon a common magnetic core, one of said circuits being closed upon itself and composed of a series of coils graduated in accordance with a sinusoidal law, and means for tapping said circuit at continuously-shifting diametrically opposite points, substantially as described.

8. A transformer for converting alternating currents into currents of one direction or vice versa, composed of coils for the reception or delivery of alternating currents and, in inductive relation thereto, coils for the delivery or reception of currents of one direction, and means for varying the coefficient of mutual induction of the two sets of coils in accordance with a sinusoidal law, substantially as described.

9. A transformer for converting alternating currents into currents of one direction or vice versa, composed of coils for the reception or delivery of alternating currents and, in inductive relation thereto, coils for the delivery or reception of currents of one direction, and means for varying the effective number of the turns of the latter in accordance with the law of variation of the alternating currents, substantially as described.

10. A transformer for converting alternating currents into currents of one direction or vice versa, composed of coils for the reception or delivery of alternating currents and, in inductive relation thereto, coils for the delivery or reception of currents of one direction, and means for varying the effective number of the turns of the latter in accordance with a sinusoidal law, substantially as described.

11. An inductive apparatus for the conversion of two or more dephased alternating currents into a single constant current of one direction or vice versa, consisting of two or more independent inductional transformers, each transformer having alternating-current coils and a series of straight-current coils, each series of straight-current coils being graduated in accordance with a sinusoidal law, and the different series being interconnected to establish a shift of phase between the graduations, and a commutator and brushes for tapping the connected series simultaneously, substantially as described.

In witness whereof we have hereunto signed our names in the presence of two subscribing witnesses.

MAURICE HUTIN.
MAURICE LEBLANC.

Witnesses:
ARMENGAUD, Jeune,
ROBT. M. HOOPER.